March 20, 1962 — L. N. FINCH — 3,026,232
METHOD FOR PROVIDING FILMS OF THERMOPLASTIC MATERIAL ON THE EXTERIOR FACES OF CATHODE RAY TUBES
Filed Jan. 30, 1959
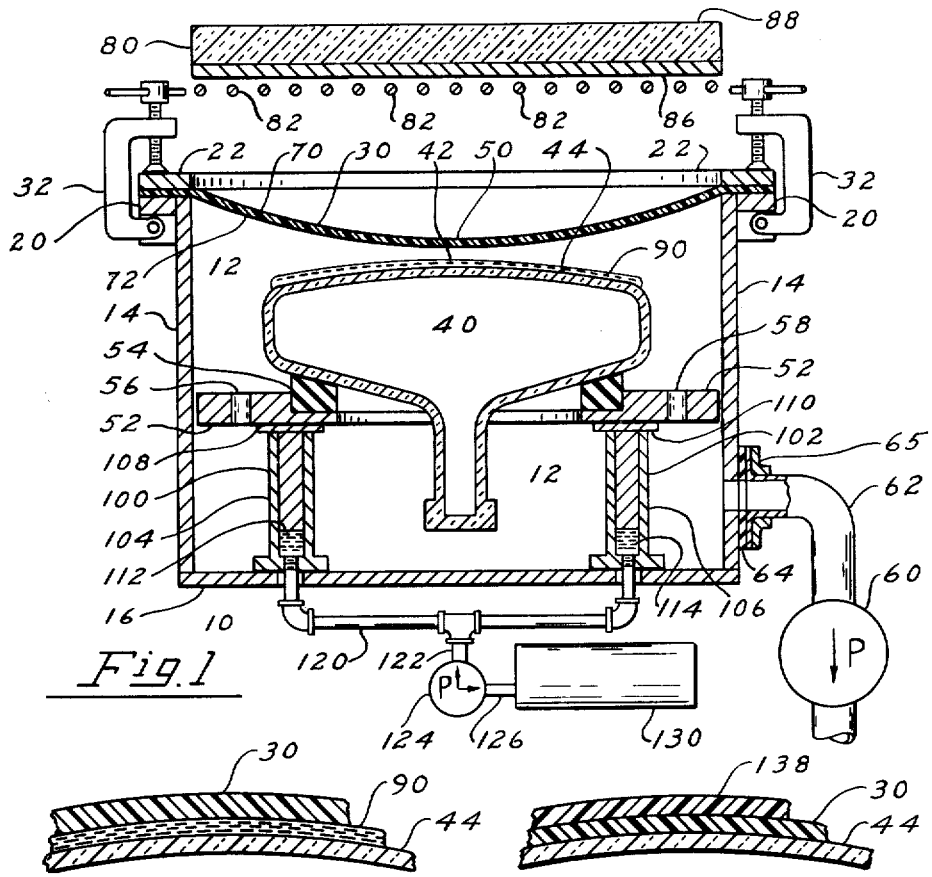
Fig.1
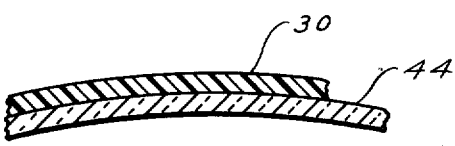
Fig.2
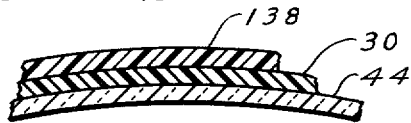
Fig.4
Fig.3
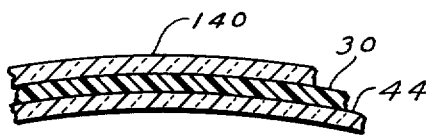
Fig.5
LIONEL N. FINCH   INVENTOR
BY
ATTORNEY / 3,026,232
METHOD FOR PROVIDING FILMS OF THERMO-
PLASTIC MATERIAL ON THE EXTERIOR FACES
OF CATHODE RAY TUBES
Lionel N. Finch, Springfield, Mass., assignor to Monsanto Chemical Company, St. Louis, Mo., a corporation of Delaware
Filed Jan. 30, 1959, Ser. No. 790,161
11 Claims. (Cl. 156—212)

The present invention relates to cathode ray tubes and more particularly to a method for providing protective films of thermoplastic material on the exterior viewing faces of same.

Cathode ray tubes, of which television picture tubes are prime examples, because of their construction are subject to being imploded, accompanied by scattering of glass particles and splinters. With the trend toward the use of tubes having larger viewing faces these possibilities have greatly increased.

To guard against the dangers inherent in tubes of this type, the practice has been to locate safety-glass shields, generally constructed of two sheets of glass laminated through an interposed sheet of plastic material, in front of the viewing faces of the tubes. Incidental with this practice, however, interference with the optical qualities of the projected image has been encountered, for the reason that the shield interjects two reflecting surfaces between the viewing face and the viewer. To combat this, an expedient practiced is that of tinting the glass shields. While tinting does serve to reduce unwanted reflections or glare, it contributes undesirably darkened images.

Another attack upon the problem has been that of providing the viewing face of the tube with a film of synthetic thermoplastic material. Though potentially an excellent solution to the problem, this expedient has received but minor acceptance. This can be attributed to the fact that, to date, none of the methods for effecting the same have avoided entrapping air in the form of minute bubbles or interstices in amounts sufficient to detract from optical clarity and contribute distorted viewing surfaces.

Accordingly, it is a principal object of the present invention to provide viewing surfaces on cathode ray tubes which resist scattering of glass particles following implosion of the tubes.

Another object is to provide the viewing faces of electronic tubes of this type with intimately contacted continuous thermoplastic films, which present non-distorted viewing surfaces.

Another object is to provide a method by which to attain the preceding objects.

Other objects will in part be obvious and will in part appear hereinafter.

These and other objects of the present invention are attained in a method which comprises contacting a convex section of thermoplastic film with the exterior surface of the viewing face of a cathode ray tube, first at about the apexes or centers of both and thereafter contacting progressively outwardly from said apexes over the remaining exterior surface of said viewing face while maintaining a liquid medium between said film and said exterior surface during contacting thereof.

For a clearer understanding of the invention, as well as the benefits which can be derived from practice of the same, the following drawings should be considered in conjunction with the written disclosure:

FIG. 1 is a front-elevational schematic representation, partly in section and with some parts broken, of vacuum-drawing apparatus which can be used in practice of the method of the present invention.

FIG. 2 is a fragmentary sectional schematic representation of the glass viewing face of a television tube coated with a liquid medium, and carrying a film of thermoplastic material.

FIG. 3 is a fragmentary sectional schematic representation of the glass viewing face of a television tube having a film of thermoplastic material laminated thereto.

FIG. 4 is a fragmentary sectional schematic representation of the glass viewing face of a television tube having a two-ply film of thermoplastic material laminated thereto.

FIG. 5 is a fragmentary sectional schematic representation of the glass viewing face of a television tube having a film of thermoplastic material, and a glass overlay, laminated thereto.

Referring now to FIG. 1, a vacuum-former 10 exemplifies apparatus on which the process of the present invention can be practiced. This constitutes a vacuum chamber 12 described by shell 14, and bottom 16. Clamp frame 20 is attached to the top exterior periphery of shell 14 in such a manner that the top surfaces of said frame 20 and shell 14 are in planar relationship to one another. Adjustable clamp frame 22 bears on thermoplastic film 30 resting on clamp frame 20 and conjunctively these frames serve to support thermoplastic film 30 over the top of chamber 12, and effectively hermetically seal chamber 12. In order that thermoplastic material 30 can be securely postioned over vacuum chamber 12, hinged clamps 32—32 are provided. With clamp frame 22 capable of being swung to and from clamp frames 20 as by hinging the said frames together in a manner not illustrated, further efficiency is gained in the operation.

Television tube 40 is most conveniently located within chamber 12, by being positioned in the center of said chamber 12 and so presenting the apex 42 of viewing face 44 of tube 40 directly below the anticipated position of apex or center 50 of thermoplastic material 30. To effect this, shelf 52 supporting a centrally located cradle 54, the latter constructed of rubber or other cushioning material, is provided within chamber 12. To facilitate equalization of the atmospheric pressure within chamber 12, shelf 52 is provided with ports 56 and 58. To provide a vacuum within chamber 12, vacuum pump 60 is connected to the chamber through conduit 62. As a precaution against leakage at the junction of conduit 62 and chamber 12, gasket 64 and backing flange 65 are provided.

Initiation of the desired convex shape in thermoplastic film 30, can be effected by the application of heat thereto, immediately prior to or simultaneously with the provision of a differential in pressure between surface 70 and surface 72 of thermoplastic material 30. In accordance with this, heating means 80 is adjustably situated above thermoplastic film 30 and incidentally above chamber 12. Heating means 80 comprises heating rods 82—82 located beneath horizontally aligned plate 86. Thermal insulation indicated at 88 is included as a precautionary as well as an efficiency measure. Heating rods 82—82 are connected to a high-voltage electrical source, not shown.

In operation, television tube 40 having a convex external glass viewing face 44, the latter coated with a liquid film 90, is positioned on cradle 54 within chamber 12. The outer periphery of thermoplastic film 30 is placed between clamp frames 20 and 22, and clamps 32—32 are screwed down on top of clamp frame 22 thus effectively hermetically sealing vacuum chamber 12. A partial vacuum is provided within vacuum chamber 12 by the operation of vacuum pump 60, and simultaneously, heater 80, which has been positioned over thermoplastic film 30, is activated. The application of vacuum and heat cause thermoplastic material 30 to be drawn into chamber 12 as to assume a convex configuration, if viewed from the inside of vacuum chamber 12. Vacuum and heating are continued causing the apex 50 of thermoplastic film 30 to come into contact with the apex or exterior center 42 of viewing face 44. The partial assembly which results at this time is of the nature shown, exaggerated as to the thickness of liquid medium 90, in FIG. 2. With maintenance of the partial pressure within chamber 12, the remaining exterior face 44 of said tube 40 is progressively contacted from the apex to the outer edges of the tube by surface 72 of thermoplastic film 30. At this time the entire viewing face 44 supports an assembly of the type shown in FIG. 2. However, the thickness of liquid medium 90 is now in actuality greatly reduced for the reason that a major portion of liquid medium 90 has been expelled from between the contacting interface. That portion of liquid 90 which does remain after contacting has taken place, is fairly restricted to that which fills interstices and minute irregularities existing at the interface of thermoplastic film 30 and viewing face 44.

The contacting procedure can be continued after the viewing face 44 has been completely contacted with thermoplastic film 30, to cause a peripheral or remaining portion of said film 30 to drape downwardly over the edge of viewing face 44. This draped portion of film 30 contacts the glass sides of television tube 40 and serves to insure that the entire viewing face 44 has become intimately contacted by thermoplastic film 30.

To aid in providing the desired initial and/or outwardly advancing contact between thermoplastic material 30 and viewing face 44 of television tube 40, hydraulic elevating means 100 and 102 are provided within chamber 12. They can be activated to raise shelf 52 together with television tube 40 stationed thereon, and so shorten the vertical distance through which film 30 need be drawn to contact viewing face 44. Additionally, with the use of elevating means 100 and 102, the film of thermoplastic material 30 on viewing face 44 exhibits greater and more uniform thickness throughout than that obtained by vacuum drawing exclusively, in that the latter tends to stretch film 30 and may effect some thinning down of film 30 in certain areas thereof.

As shown, elevating means 100 and 102 comprise cylinders 104 and 106, pistons 108 and 110 and quantities of hydraulic fluid 112 and 114 located within said cylinders. Uniform raising and lowering of elevating means 100 and 102 is had by coordinating them into a single hydraulic system shown constructed of pipes 120 and 122 leading into pump 124 which in turn has an afterpipe 126 connected to hydraulic fluid reservoir 130.

After the entirety of viewing face 44, and preferably part of the side of tube 40 has been contacted with a film of thermoplastic material 30 in the manner disclosed, the tube is removed from chamber 12 and the remainder of thermoplastic material 30 is disengaged by cutting, trimming and the like. The assembly can then be subjected to a lamination step designed to contribute more permanent lamination or bonding between the film 30 and the glass viewing face 44. After the lamination step, a laminated product of the type shown in FIG. 3 results when a single film of thermoplastic material 30 has been drawn into contact with viewing face 44. A laminated product of the type shown in FIG. 4 results when a prelaminated multiply film of thermoplastic materials 30 and 138 has been drawn into contact with viewing face 44 in the same manner as described for the film 30. It should be noted that neither the tube surface nor the film applied thereto as shown in FIG. 3 or FIG. 4 is characterized by the presence of a liquid interface, of the type shown (exaggerated) in FIG. 2. It is theorized that the lamination step causes the liquid interface 90 to lose its identity by being assimilated into the thermoplastic film 30. However, it is also possible that other phenomena contribute to this, as by evaporation of the liquid medium, etc. As indicated, this step serves the primary purpose of causing permanent bonding between the individual lamina. Using apparatus of the type disclosed in FIG. 1, the bonding or lamination step can be carried out by activating the components of heater 80 to contribute a temperature of 50° C. to 150° C. at the interface defined for bonding, and exposing the assembly to the same for a period of about 1 minute to 30 minutes while maintaining the thermoplastic material 30 securely pressed against viewing face 44.

With the completion of the lamination step viewing face 44 and thermoplastic material 30 are intimately contacted throughout, thereby effectively eliminating refracting surfaces. As illustrated in FIG. 3 the laminated tubes can be used directly if they present a viewing face of thermoplastic material which is resistant to scratching and is comparatively non-hydroscopic. However, the viewing face illustrated in FIG. 3 being of a single ply of thermoplastic material, the latter is constituted of plasticized polyvinyl butyral which while capable of being polished to effect excellent optical quality therein, nevertheless is prone to being scratched and also may absorb water vapor. In such a situation it is preferred that an overlay of comparatively harder thermoplastic material 138 such as polystyrene, polycarbonate or glass 140 or the like be superimposed over thermoplastic film 30 to obtain a viewing surface of the type shown in FIG. 4 or FIG. 5. In providing these, it is proposed that overlays 138 and 140 have preformed configurations corresponding to the outer configuration of film 30 covering viewing face 44. It is further suggested that a liquid medium be provided between film 30 and the preformed overlay and that the resulting assembly be subjected to a lamination step of the type previously described.

The ultimate, laminated tubes preferably have cross-sectional configurations of the type shown in FIG. 4 or in FIG. 5. They are accompanied by added resistance to imploding, and if imploding does take place it is less likely to occasion scattering of glass spliners, particles and the like. In addition, the tubes evidence excellent opticle qualities at their viewing surfaces.

While the preceding discussion has been principally in terms of completed television tubes, the procedure as described can also be carried out on glass envelopes designed for assembly into tubes of this type.

The following examples are given in further illustration of the invention.

Example I

A television picture tube (assembled and evacuated) having a 17-inch viewing face is placed in the vacuum chamber of a vacuum-forming apparatus of the type previously described. A 15 mil film of plasticized polyvinyl butyral, coated at one side with triethylene glycol-di-(2-ethyl butyrate), is clamped over the top of the vacuum chamber, with the coated surface presented to the vacuum chamber. The heater is set at a temperature of 1000° F. and position seven (7) inches removed above the film for 10 seconds. Simultaneously the vacuum system is operated to provide a partial pressure down to about 700 mm. Hg within the vacuum chamber. As a result, the film of polyvinyl butyral is drawn into the chamber in a convex configuration, and at about the apex thereof comes into contact with the apex of the viewing face of the tube. With continued evacuation, drawing of the film continues, causing it to contact the remainder of the viewing face progressively and outwardly from the apex thereof. Vacuum drawing is continued until 1–2 inches of film drapes over the edge of the viewing face and intimately contacts the side thereof.

Polyvinyl butyral film remaining uncontacted is trimmed away around the sides of the tube, and is then unclamped from the top of the chamber. The tube is then removed from the chamber and a tape of plasticized polyvinyl butyral, the inner surface of which is softened with methanol, is secured tightly over the draped portion of the polyvinyl butyral film.

After the tube is repositioned in the vacuum chamber, a sheet of .125 inch thickness rubber is clamped over the top of the chamber. The heater, activated to a temperature of about 750° F. is positioned intermittently, 2 minutes exposure and 4 minutes removed, for a total of 20 minutes over the top of the chamber. Simultaneously a partial vacuum is provided in the chamber sufficient to keep the rubber sheet tightly drawn over the contacted plasticized polyvinyl butyral film.

The laminated tube is allowed to cool in the vacuum chamber while vacuum operation is maintained. Thereafter vacuum operation is discontinued and the vacuum broken to release the rubber sheet. When removed from the vacuum chamber, the laminated tube shows excellent optical clarity at the laminated interface without any evidence of distortion. Air bubbles or other voids cannot be discerned when the viewing surface of the tube is examined under a 10× lens.

The viewing surface of the laminated tube which now presents a film of plasticized polyvinyl butyral is coated with triethylene glycol-di-(2-ethyl butyrate) and a preformed glass overlay is superimposed over the same. The assembly is replaced in the vacuum chamber and the sheet of rubber clamped over the top of the chamber. The lamination conditions of temperature and vacuum used earlier, are again utilized. With the completion of this second lamination and removal from the vacuum chamber, the tube is observed again and evidences excellent optical qualities throughout, with no distortion which can be discerned.

*Example II*

A 17-inch television tube envelope, the viewing face of which has been coated with butyl Cellosolve, is placed in the vacuum-drawing apparatus. A thermoplastic film constituting 15 mil plasticized polyvinyl butyral prelaminated with 6 mil polycarbonate, is clamped over the top of the vacuum chamber with the plasticized polyvinyl butyral surface presented to the chamber. The heater is set at 1000° F. and positioned seven (7) inches removed above the thermoplastic film for a period of about 15 seconds. Simultaneously the vacuum pump is operated as to provide a partial vacuum down to about 640 mm. Hg in the chamber, causing the thermoplastic film to progressively contact the viewing surface and partly down the side of the tube in the manner of the previous example. After cooling under vacuum and disengagement of the remainder of the film the film-coated tube is removed from the vacuum chamber and a plasticized polyvinyl butyral tape, softened at the inner surface with methanol, is placed over that portion of the film which drapes the side of the tube.

The assembly is then placed in an oven and a temperature of 60° C.–100° C. applied for a period of 5 hours.

When removed, the laminated tube face exhibits excellent optical clarity, unaccompanied by optical distortion.

*Example III*

The procedure set forth in Example II is again followed in providing the viewing surface of a television tube envelope with a prelaminated film constituting 15 mil plasticized polyvinyl butyral and 10 mil polystyrene. After lamination the viewing surface is characterized by excellent optical clarity unaccompanied by any optical distortion.

The method of the present invention is practiced on cathode ray tubes having protruding or convex-shaped exterior glass viewing faces. Outstanding examples of these are television picture tubes. Either the glass envelopes designed for use as tubes or the assembled tubes themselves can be practiced upon.

The thermoplastic materials which are prescribed are films or sheets at least one surface of which constitutes plasticized polyvinyl butyral. The films can be entirely of plasticized polyvinyl butyral or can be laminates containing at least a single lamina of plasticized polyvinyl butyral and another lamina or other laminae constituted of other thermoplastic materials such as polystyrene, polycarbonate, polyethylene terephthalate, polymethylmethacrylate, nylon, cellulose acetate butyrate, cellulose triacetate, ethyl cellulose, and the like. When the film is a laminate of the type indicated, at least one surface of the film must be formed by a lamina of plasticized polyvinyl butyral, the same to serve as the surface which is to be contacted with the exterior surface of the glass viewing face of the tube. Otherwise, if the film is a thermoplastic laminate, it can contain any number of laminae. Preferably, however, the number of plies is restricted to two. The thickness of the thermoplastic film whether it be the unitary or laminate type depends upon the desired amount of strength to be contributed to, and the amount of light transmission for, a given tube. The plasticized polyvinyl butyral comprises polyvinyl butyral resin and plasticizer. The polyvinyl butyral resins prescribed can contain up to 25% hydroxyl groups calculated as polyvinyl alcohol, up to 3% acetone groups calculated as polyvinyl acetate with the balance being polyvinyl butyral. Plasticizers which can be used include triethylene glycol-di-(2-ethylbutyrate), dibutyl Cellosolve adipate, dibutyl sebacate, etc. The amount of plasticizer to be used ranges between 7–60 parts per 100 parts of resin.

The liquid medium which is to be presented to, or between the contacting surfaces of the thermoplastic film and the glass viewing face of the tube can be formed by liquification of the contacting surface of the thermoplastic film. While this can be attained by physical means such as the application of heat, a simpler procedure calls for the use of a liquid medium such as a solvent or a plasticizer for polyvinyl butyral. These should have boiling points above the temperature at which the film of thermoplastic material is to be shaped. When a unitary film of plasticized polyvinyl butyral is used, solvents and plasticizers having lower boiling points can be used in that the butyral is flexible at room temperature. When the thermoplastic film is a laminate, plies of which are constituted of materials such as polystyrene and the like, higher operating temperatures can be anticipated and the use of solvents and plasticizers having correspondingly higher boiling points are prescribed. Examples of the preceding include high boiling solvents such as cyclohexanone, Carbitol and butyl Cellosolve; and plasticizers such as dibutyl sebacate, dibutyl Cellosolve adipate, triethylene glycol-di-(2-ethylbutyrate) and mixtures of the same. These can be applied to either or both the thermoplastic material or the viewing face of the tube by coating, spraying, brushing or the like at any time prior to effecting contact between the thermoplastic material and the viewing face.

A number of methods utilizing various apparatus can be used in practice of the method of the present invention. In addition to vacuum-forming apparatus, which will be described in detail, other apparatus which can be used include those involving positive air pressure forming; flexible air bags activated by ram action; contoured, resilient cushions activated by ram action; and others.

The process, and consequently the apparatus used, should be capable of lending a convex configuration to that surface of the thermoplastic material film which is to be contacted with the convex exterior face of the tube. Broadly, to effect this, the apparatus should have the capability of producing a differential in pressure between the surfaces of the film. This can be accomplished by means capable of varying pressure between the surfaces of the film. Illustratively, variations in pneumatic pressures between the surfaces can be used as by establishing a positive pressure at the surface furthest from the viewing face of the tube or by establishing a partial vacuum at the surface to be presented to the viewing face, or by use of both. In addition, mechanical and other types of pressures can be used to accomplish this.

It is also desirable for the apparatus to be provided with heating means capable of providing the thermoplastic film temperatures of above room temperature and up to about 250° C. which will cause the thermoplastic material to soften and subject to being easily shaped into the desired convex configuration.

While the thermoplastic films can be given the required convex configuration in a separate preforming step on the same or different apparatus, or in the same apparatus immediately prior to and in part simultaneously with contacting of the same with the viewing face of the tube, the latter is the more desirable procedure.

It will thus be seen that the objects set forth above among those made apparent from the preceding description are efficiently attained; and since certain changes may be made in the apparatus or in the method disclosed for providing thermoplastic films in intimate contact with the viewing faces of cathode ray-type tubes without departing from the scope of the invention, it is intended that all matter contained in the above description shall be interpreted as illustrative and not in a limiting sense.

What is claimed is:

1. A method for providing the convex exterior surface of the face of a cathode ray tube with an intimately contacted continuous thermoplastic film which comprises contacting a convex shaped thermoplastic film with the exterior surface of the viewing face of said tube first at about the apexes of both the film and the face and thereafter progressively contacting said film from said apexes outwardly over the remaining exterior surface of the viewing face while maintaining a liquid medium between said film and the surface of said viewing face during contacting thereof, said thermoplastic film being constituted of plasticized polyvinyl butyral at least at the surface thereof which contacts the exterior surface of the viewing face of said cathode ray tube.

2. A method for providing the convex exterior surface of the viewing face of a cathode ray tube with an intimately contacted continuous thermoplastic film which comprises extending a thermoplastic film in a convex configuration by providing (a) a differential in pressure across the surfaces of said film and (b) heating said thermoplastic material to a temperature of above about room temperature and up to about 250° C., and while said film is so extended, contacting said film with the viewing face of said tube first at about the centers of the film and face and then progressively contacting said film from the center outwardly over the remainder of the exterior surface of the viewing face of said tube, while maintaining a liquid medium at the surfaces being contacted, said thermoplastic film being constituted of plasticized polyvinyl butyral at least at the surface thereof which contacts the exterior surface of the viewing face of said cathode ray tube.

3. The method according to claim 2 wherein the thermoplastic film consists of plasticized polyvinyl butyral.

4. The method according to claim 2 wherein the thermoplastic film comprises a laminate of plasticized polyvinyl butyral and polystyrene.

5. The method according to claim 2 wherein the thermoplastic film comprises a laminate of plasticized polyvinyl butyral and polycarbonate.

6. The method according to claim 2 wherein the thermoplastic film comprises a laminate of plasticized polyvinyl butyral and polyethylene terephthalate.

7. The method according to claim 2 wherein the thermoplastic film comprises a laminate of plasticized polyvinyl butyral and polymethyl methacrylate.

8. The method according to claim 2 wherein the liquid medium results from interposing between said film and said viewing face a liquid selected from the class consisting of butyl Cellosolve, dibutyl sebacate, dibutyl Cellosolve adipate, triethylene glycol-di-(2-ethyl butyrate) and mixtures of the same.

9. The method according to claim 2 wherein the differential in pressure across the surfaces of the thermoplastic film is obtained by providing at least a partial vacuum at that surface designed to effect said convex configuration.

10. The method according to claim 2 wherein the differential in pressure across the surfaces of the thermoplastic film is obtained by providing a pressure greater than atmospheric pressure at that surface opposite to the surface designed to effect a convex configuration.

11. A method of providing a continuous thermoplastic film onto the face of a cathode ray tube by which air entrapment is minimized at the interface thereof during the process of applying said plastic film which method comprises contacting a convex shaped thermoplastic film with the exterior surface of the viewing face of said tube first at about the apexes of both the film and the face and thereafter progressively contacting said film from said apexes outwardly over the remaining exterior surface of the viewing face while maintaining a liquid medium between said film and the surface of said viewing face during contacting thereof, said thermoplastic film being constituted of plasticized polyvinyl butyral at least at the surface thereof which contacts the exterior surface of the viewing face of said cathode ray tube.

References Cited in the file of this patent

UNITED STATES PATENTS

| 1,478,862 | Rosenthal | Dec. 25, 1923 |
| 2,690,410 | Nelson | Sept. 28, 1954 |
| 2,725,319 | Tarnopol | Nov. 29, 1955 |
| 2,828,799 | Harrison | Apr. 1, 1958 |
| 2,837,454 | Watkins et al. | June 3, 1958 |

FOREIGN PATENTS

| 389,106 | Great Britain | Mar. 9, 1933 |
| 460,230 | Great Britain | Jan. 25, 1937 |

UNITED STATES PATENT OFFICE
CERTIFICATE OF CORRECTION

Patent No. 3,026,232

March 20, 1962

Lionel N. Finch

It is hereby certified that error appears in the above numbered patent requiring correction and that the said Letters Patent should read as corrected below.

Column 4, line 39, for "opticle" read -- optical --; column 6, line 23, for "acetone" read -- acetate --.

Signed and sealed this 10th day of July 1962.

(SEAL)
Attest:

ERNEST W. SWIDER
Attesting Officer

DAVID L. LADD
Commissioner of Patents